(12) United States Patent
Tomiyasu

(10) Patent No.: US 9,544,490 B2
(45) Date of Patent: Jan. 10, 2017

(54) IMAGE PROCESSING DEVICE, IMAGING DEVICE, IMAGE PROCESSING METHOD, AND RECORDING MEDIUM STORING IMAGE PROCESSING PROGRAM

(71) Applicant: Takashi Tomiyasu, Kanagawa (JP)

(72) Inventor: Takashi Tomiyasu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 62 days.

(21) Appl. No.: 14/611,407

(22) Filed: Feb. 2, 2015

(65) Prior Publication Data
US 2015/0229816 A1 Aug. 13, 2015

(30) Foreign Application Priority Data
Feb. 13, 2014 (JP) .................................. 2014-025274

(51) Int. Cl.
*H04N 5/232* (2006.01)

(52) U.S. Cl.
CPC ..................................... *H04N 5/232* (2013.01)

(58) Field of Classification Search
CPC ............. H04N 1/00978–1/00989; H04N 5/232
See application file for complete search history.

(56) References Cited

U.S. PATENT DOCUMENTS

| 2012/0189264 A1* | 7/2012 | Okazaki ................. H04N 5/772 386/227 |
| 2013/0037533 A1* | 2/2013 | Namekawa ............ H04N 5/232 219/494 |
| 2013/0120630 A1* | 5/2013 | Kim .................... H04N 5/23241 348/333.01 |

FOREIGN PATENT DOCUMENTS

| JP | 2003-283901 | 10/2003 |
| JP | 2005-352412 | 12/2005 |
| JP | 2008-005353 | 1/2008 |

* cited by examiner

Primary Examiner — Christopher K Peterson
(74) Attorney, Agent, or Firm — Oblon, McClelland, Maier & Neustadt, L.L.P.

(57) ABSTRACT

An image processing device, an image processing method, and a recording medium storing an image processing program are provided. The image processing device includes an image processing unit configured to perform image processing on image data, a temperature obtaining unit configured to obtain an inner-device temperature and outer-device temperature of the image processing device, and a frame rate changing unit configured to change a frame rate of the image data processed by the image processing unit, based on a temperature difference between the inner-device temperature and the outer-device temperature. Each of the image processing method and the image processing program performs image processing on image data, obtains an inner-device temperature and outer-device temperature of the image processing device, and changes a frame rate of the image data, based on a temperature difference between the inner-device temperature and the outer-device temperature.

18 Claims, 8 Drawing Sheets

IMAGE PROCESSING DEVICE, IMAGING DEVICE, IMAGE PROCESSING METHOD, AND RECORDING MEDIUM STORING IMAGE PROCESSING PROGRAM

CROSS-REFERENCE TO RELATED APPLICATION

This patent application is based on and claims priority pursuant to 35 U.S.C. §119(a) to Japanese Patent Application No. 2014-025274, filed on Feb. 13, 2014, in the Japan Patent Office, the entire disclosure of which is hereby incorporated by reference herein.

BACKGROUND

Technical Field

Example embodiments of the present invention relate to an image processing device, an imaging device, an image processing method, and a recording medium storing an image processing program.

Background Art

It is known that the inner temperature of an imaging device provided with imaging elements increases due to the power consumption of these imaging elements and other electronic components of the imaging device.

As the image quality or functionality is developed, the demand for the downsizing of imaging devices is increasing. However, as the downsizing of imaging devices advances, heat is more easily accumulated inside the imaging device.

When electronic components such as imaging elements are affected by heat, noise may occur on the image data obtained by the imaging device. This results in deterioration in the image quality of the image data. Moreover, when a temperature difference is caused between inside and outside the imaging device, condensation due to such a temperature difference may occur on electronic components inside the imaging device.

To deal with such situation, it is known to provide heat-dissipating mechanism using heat-dissipative member or coolant inside the imaging device in order to prevent condensation or attenuate deterioration in the image quality of image data due to the increased temperature inside the imaging device.

SUMMARY

Embodiments of the present invention described herein provide an image processing device, an image processing method, and a recording medium storing an image processing program. The image processing device includes an image processing unit configured to perform image processing on image data, a temperature obtaining unit configured to obtain an inner-device temperature and outer-device temperature of the image processing device, and a frame rate changing unit configured to change a frame rate of the image data processed by the image processing unit, based on at least one of the inner-device temperature, the outer-device temperature, and a temperature difference between the inner-device temperature and the outer-device temperature. Each of the image processing method and the image processing program performs image processing on image data, obtains an inner-device temperature and outer-device temperature of the image processing device, and changes a frame rate of the image data, based on at least one of the inner-device temperature, the outer-device temperature, and a temperature difference between the inner-device temperature and the outer-device temperature.

BRIEF DESCRIPTION OF THE SEVERAL VIEWS OF THE DRAWINGS

A more complete appreciation of exemplary embodiments and the many attendant advantages thereof will be readily obtained as the same becomes better understood by reference to the following detailed description when considered in connection with the accompanying drawings.

Figure 1:
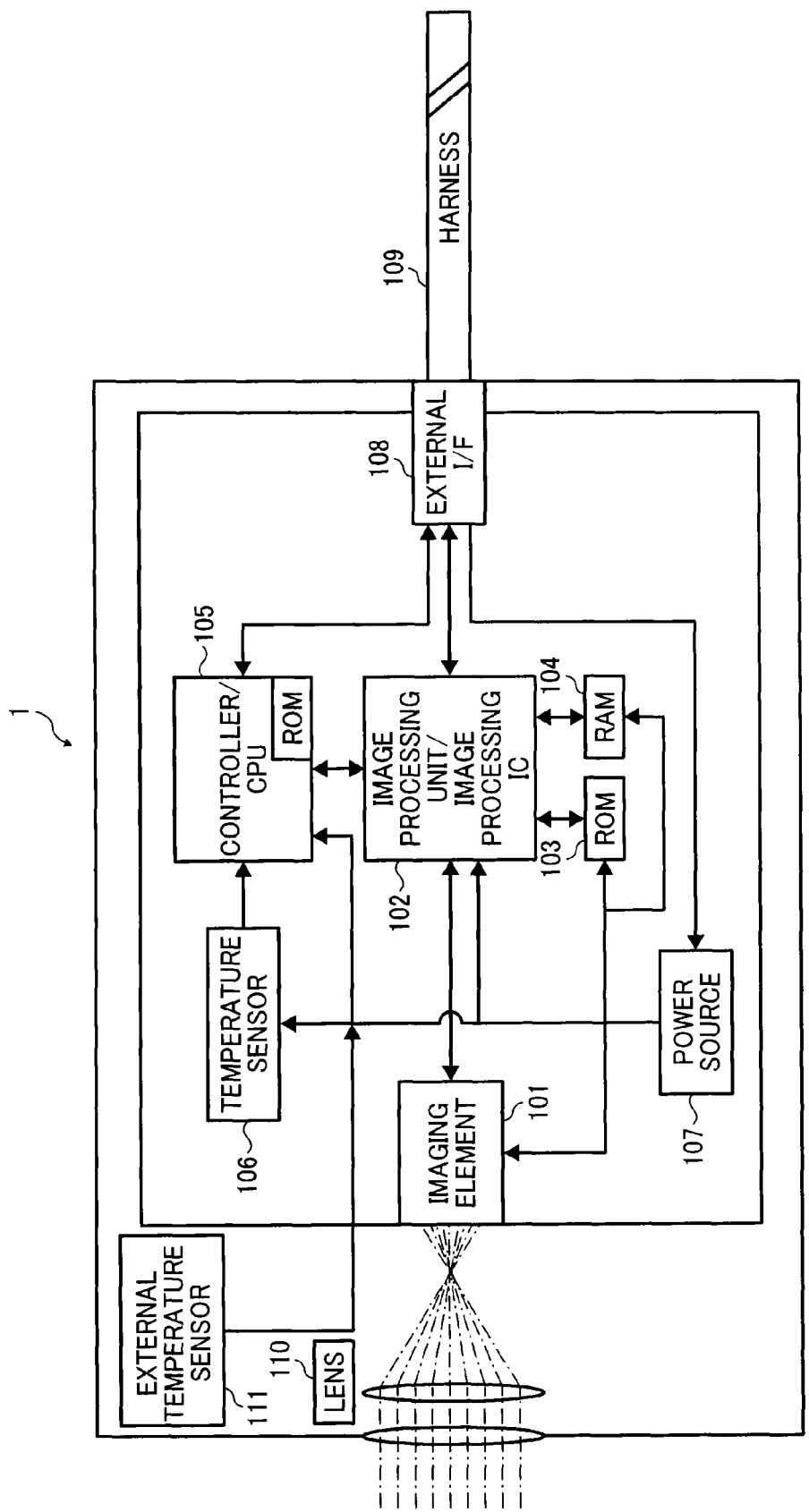
FIG. 1 is a block diagram of an imaging device according to an example embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits (ASICs), field programmable gate arrays (FPGAs) computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An image processing device, an imaging device, an image processing method, and a recording medium storing an image processing program according to an example embodiment of the present invention are described below with reference to the drawings.

<Imaging Device>

Firstly, an imaging device according to an example embodiment of the present invention is described. The imaging device according to the present example embodiment includes an image processing device according to an example embodiment of the present invention and an imaging unit that obtains image data.

For example, the imaging device according to the present example embodiment may be installed in a vehicle, and is applied to various kinds of vehicle-installed camera such as a camera for object detection or a camera for a drive recorder that captures images in the direction of travel of a vehicle.

However, it is to be noted that the use of the imaging device according to the present example embodiment is not limited to these example applications. For example, the imaging device according to the present example embodiment may be applied to surveillance cameras that are installed in supermarkets or convenience stores. Moreover, the imaging device according to the present example embodiment may be applied to safety devices of railways or shipping, or imaging devices in the factory automation (FA) fields.

Note that the image processing device according to the present example embodiment is not limited to an image processing device installed in an imaging device but may be installed in various kinds of devices with an image processing device, such as an image display.

FIG. 1 is a block diagram of an imaging device according to the present example embodiment. As illustrated in FIG. 1, an imaging device 1 according to the present example embodiment includes an imaging element 101, an image processing unit 102, a read only memory (ROM) 103, a random access memory (RAM) 104, and a controller 105.

Moreover, the imaging device 1 includes a temperature sensor 106, a power source 107, an external interface (I/F) 108, a harness 109, a lens 110, and an external temperature sensor 111.

The imaging element 101 is, for example, a charge-coupled device (CCD) or a complementary metal oxide semiconductor (CMOS), and performs photoelectric conversion on the light concentrated through the lens 110. Note that the imaging element 101 serves as an imaging unit of the imaging device.

The image processing unit 102 is, for example, an image processing integrated circuit (IC), and performs image processing by processing the data signal received from the imaging element 101.

The image processing unit 102 reads a parameter from the RAM 104 in which parameters are stored in advance, and controls the imaging element 101 using the parameter. The image processing unit 102 controls the frame rate of the imaging element 101 based on the instructing commands for frame rate sent from the controller 105.

Moreover, the image processing unit 102 converts the format of the image data received from the imaging element 101 into the format of image data compatible with the specification of the external device to which the imaging device 1 is connected. In the cases of vehicle-installed cameras, the format of image data may be, for example, D4, National Television System Committee (NTSC), and low voltage differential signal (LVDS).

The ROM 103 stores in advance the data of, for example, parameters for image processing, initial settings of the imaging device 1, and prescribed temperature or temperature difference to be used by an image processing program according to an example embodiment of the present invention. Moreover, the ROM 103 stores the image processing program according to the present example embodiment.

The RAM 104 stores the obtained image data on a temporary basis. Moreover, after the imaging device 1 starts operating, the RAM 104 stores the data of, for example, parameters for image processing, and prescribed temperature or temperature difference to be used by the image processing program according to an example embodiment of the present invention, on a temporary basis.

The controller 105 is a computer such as a CPU capable of executing a program, and controls the inner electric components of the imaging device 1. The controller 105 executes an image processing method according to an example embodiment of the present invention according to the image processing program read from the ROM 103. For example, the controller 105 serves as a temperature obtaining unit and a frame rate changing unit of the image processing device according to the present example embodiment.

The controller 105 obtains the inner-device temperature from the temperature sensor 106 that measures the inner-device temperature of the imaging device 1 when the imaging device 1 starts operating and while the imaging device 1 is operating. Moreover, the controller 105 obtains the outer-device temperature from the external temperature sensor 111 that measures the outer-device temperature of the imaging device 1 when the imaging device 1 starts operating and while the imaging device 1 is operating.

Then, the controller 105 generates instructing commands for changing the frame rate of the image data processed by the image processing unit 102, based on the difference between the inner-device temperature and the outer-device temperature, and transmits the generated instructing commands to the image processing unit 102.

The temperature sensor 106 is, for example, a thermistor or a thermocouple, and measures the inner temperature of the imaging device 1, in particular, the temperature of the imaging element 101. It is desired that the temperature sensor 106 be arranged near the imaging element 101 as much as possible so as not to be influenced by the heat radiated from other elements.

The temperature sensor 106 is arranged near the imaging element 101 because the temperature sensor 106 generates the greatest amount of heat among the inner electronic components of the imaging device 1 and causes deterioration in image quality as the temperature increases. In other words, the temperature of the imaging element 101 is to be measured precisely with higher priority than the other inner electronic components of the imaging device 1.

The power source 107 supplies power to the inner electronic components of the imaging device 1.

The external interface 108 transmits various kinds of data such as the image data output from the image processing unit 102, and receives various kinds of data such as the data of absolute temperature from an external device.

The harness 109 electrically connects an external device to the imaging device 1.

The lens 110 is an imaging lens that forms an object image on the light receiving surface of the imaging element 101.

In a similar manner to the external temperature sensor 111, the temperature sensor 106 is, for example, a thermistor or a thermocouple, and measures the outer temperature of the imaging device 1.

<Image Processing Method (1)>

An image processing method according to the present example embodiment of the present invention is described below. The image processing method according to the present example embodiment of the present invention is performed by the controller 105 of the imaging device 1. In the present example embodiment, the controller 105 performs the image processing method in accordance with the temperature change caused while the imaging device 1 is operating at normal frame rate (e.g., 60 frames per second (fps)).

When the image processing method is performed, the controller 105 switches the operation based on a threshold temperature of the inner-device temperature (prescribed inner-device temperature), a threshold temperature of the outer-device temperature (prescribed outer-device temperature), and a threshold temperature difference of the temperature difference between inside and outside the device (prescribed temperature difference), each of which is stored in the ROM 103.

Note that the threshold temperature of the inner-device temperature includes a high inner-device threshold temperature that is a threshold temperature used to determine whether or not to perform high-temperature operation, a low inner-device threshold temperature that is a threshold temperature used to determine whether or not to perform low-temperature operation, and a normal inner-device threshold temperature that is a threshold temperature used to determine whether or not to perform normal operation.

Moreover, the threshold temperature of the outer-device temperature includes a high outer-device threshold temperature that is a threshold temperature used to determine whether or not to perform high-temperature operation, a low outer-device threshold temperature that is a threshold temperature used to determine whether or not to perform low-temperature operation, and a normal outer-device threshold temperature that is a threshold temperature used to determine whether or not to perform normal operation.

Figure 2:
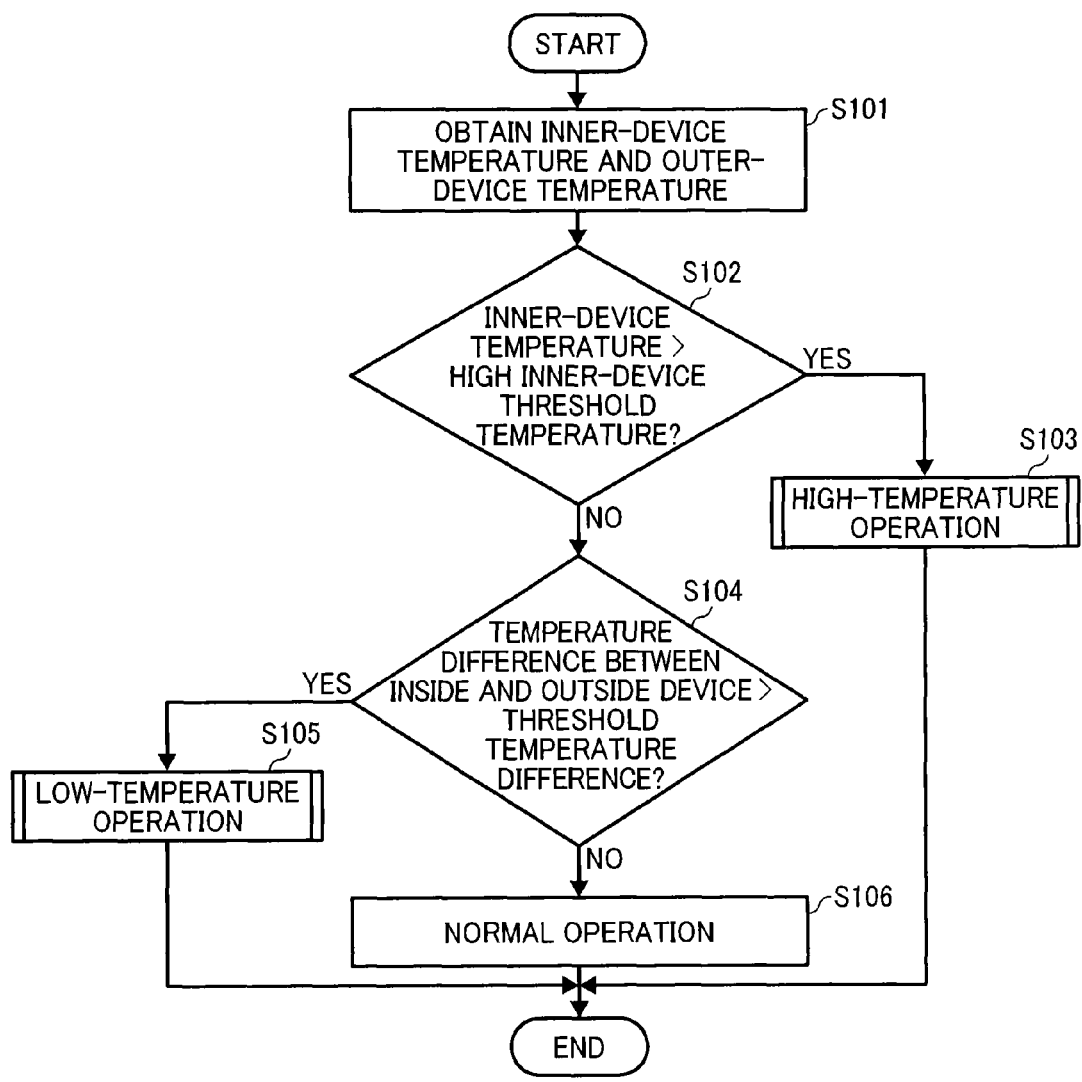
FIG. 2 is a flowchart of an image processing method with the imaging device of FIG. 1, according to an example embodiment of the present invention.

FIG. 2 is a flowchart of an image processing method performed by the imaging device 1, according to the present example embodiment. As illustrated in FIG. 2, the controller 105 obtains the inner-device temperature and the outer-device temperature from the temperature sensor 106 and the external temperature sensor 111, respectively (S101).

After the inner-device temperature and the outer-device temperature are obtained, the controller 105 determines whether or not the inner-device temperature exceeds a high inner-device threshold temperature stored in the ROM 103 (S102).

When the inner-device temperature exceeds a high inner-device threshold temperature ("YES" in S102), the controller 105 performs high-temperature operation (S103) as will be described later and terminates the process.

When the inner-device temperature is lower than a high inner-device threshold temperature ("NO" in S102), the controller 105 determines whether or not a temperature difference between inside and outside the device exceeds a threshold temperature difference (S104).

When the temperature difference between inside and outside the device exceeds a threshold temperature difference (for example, +8 degree Celsius) ("YES" in S104), the controller 105 performs low-temperature operation (S105) as will be described later and terminates the process.

On the other hand, when the temperature difference between inside and outside the device is smaller than a threshold temperature difference ("NO" in S104), the controller 105 performs normal operation (S106) and terminates the process. Note that the normal operation indicates an operation in which image processing is performed at a normal frame rate unlike high-temperature operation or low-temperature operation in which the frame rate is changed.

<High-Temperature Operation>

Next, high-temperature operation in the image processing method according to the present example embodiment of the present invention is described. The high-temperature operation is performed, for example, to deal with a problem such as deterioration in image quality caused due to the high temperature inside the imaging device 1.

More specifically, the high-temperature operation is an operation in which the frame rate of the imaging element 101 is changed to control the amount of the heat generated by the imaging element 101. By so doing, the temperature difference between inside and outside the imaging device 1 is attenuated.

Figure 3:
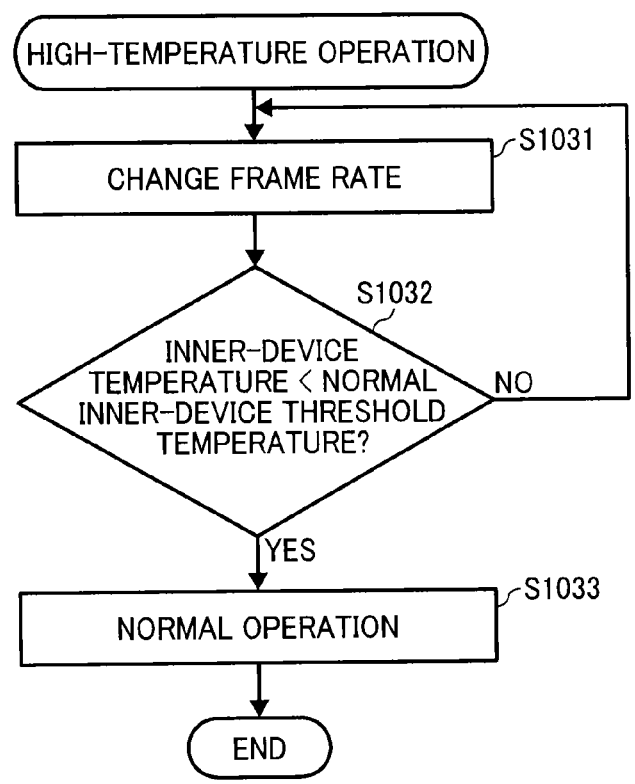
FIG. 3 is a flowchart of high-temperature operation in the image processing method of FIG. 2, according to an example embodiment of the present invention.

FIG. 3 is a flowchart of high-temperature operation in the image processing method of FIG. 2, according to the present example embodiment. As illustrated in FIG. 3, the controller 105 changes the frame rate in the high-temperature operation (S1031).

Figure 4:
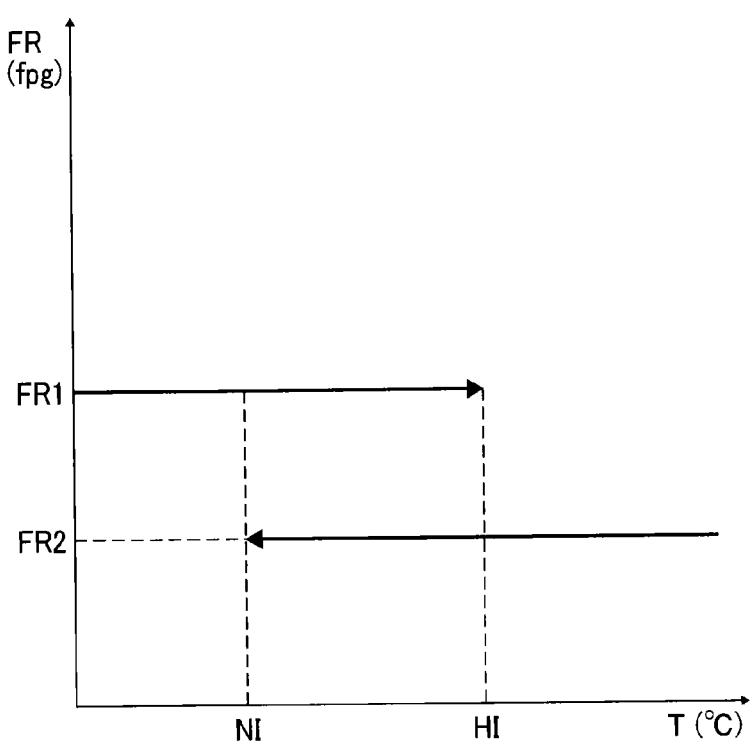
FIG. 4 illustrates the relationship between the frame rate and the inner-device temperature in the high-temperature operation of FIG. 3, according to an example embodiment of the present invention.

FIG. 4 depicts the relationship between the frame rate FR and the inner-device temperature T in the high-temperature operation of FIG. 3, according to the present example embodiment. As depicted in FIG. 4, when the inner-device temperature T is lower than the high inner-device threshold temperature HI (for example, 60 degree Celsius), the controller 105 sets the frame rate FR to an FR 1 (that is, for example, 60 fps) as the normal operation.

On the other hand, as depicted in FIG. 4, when the inner-device temperature T is higher than the high inner-device threshold temperature HI, the controller 105 sets the frame rate FR to an FR 2 (that is, for example, 30 fps) as the high-temperature operation. The controller 105 transmits the commands for decreasing the frame rate of the imaging element 101 to the image processing unit 102.

Note that the parameters stored in the RAM such as inner-device threshold temperature, outer-device threshold temperature, a threshold temperature difference, or the values of frame rates corresponding to the threshold temperature are not limited to the above-described values, but may be any value as desired. The controller 105 may increase the frame rate when the inner-device temperature has reached a prescribed inner-device threshold temperature in order to decrease the inner-device temperature. The parameters may be changed within a prescribed range based on, for example, the inner-device temperature, the outer-device temperature, or the temperature difference between inside and outside the device obtained by the controller 105.

Upon receiving the commands from the controller 105, the image processing unit 102 reads the parameter of frame rate from the RAM 104, and transmits the read parameter to the imaging element 101. The imaging element 101 changes the frame rate according to the received parameter, and outputs the obtained image data.

After the frame rate is changed, the controller 105 determines whether or not the inner-device temperature T is lower than a normal inner-device threshold temperature NI (i.e., 40 degree Celsius in FIG. 4) (S1032).

When the inner-device temperature T exceeds the normal inner-device threshold temperature NI ("NO" in S1032), the controller 105 returns to the process in S1031 and changes the frame rate.

When the inner-device temperature T is lower than the normal inner-device threshold temperature NI ("YES" in S1032), the controller 105 transmits commands for changing the frame rate back to the original frame rate FR1 to the image processing unit 102 and shifts to the normal operation, and then terminates the high-temperature operation (S1033).

<Low-Temperature Operation>

Next, low-temperature operation in the image processing method according to the present example embodiment of the present invention is described. The low-temperature operation is performed to deal with a problem such as condensation caused due to the temperature difference between inside and outside the imaging device 1. Such a problem occurs, for example, when the imaging device 1 is left in a subfreezing condition for a while and the inner temperature of the imaging device 1 increases after the startup or when the imaging device 1 is cooled down by an air conditioner while the imaging device 1 is operating.

In other words, the low-temperature operation is performed to attenuate the temperature difference between inside and outside the imaging device 1 by changing the frame rate obtained by the imaging element 101 to control the amount of heat generated by the imaging element 101.

Figure 5:
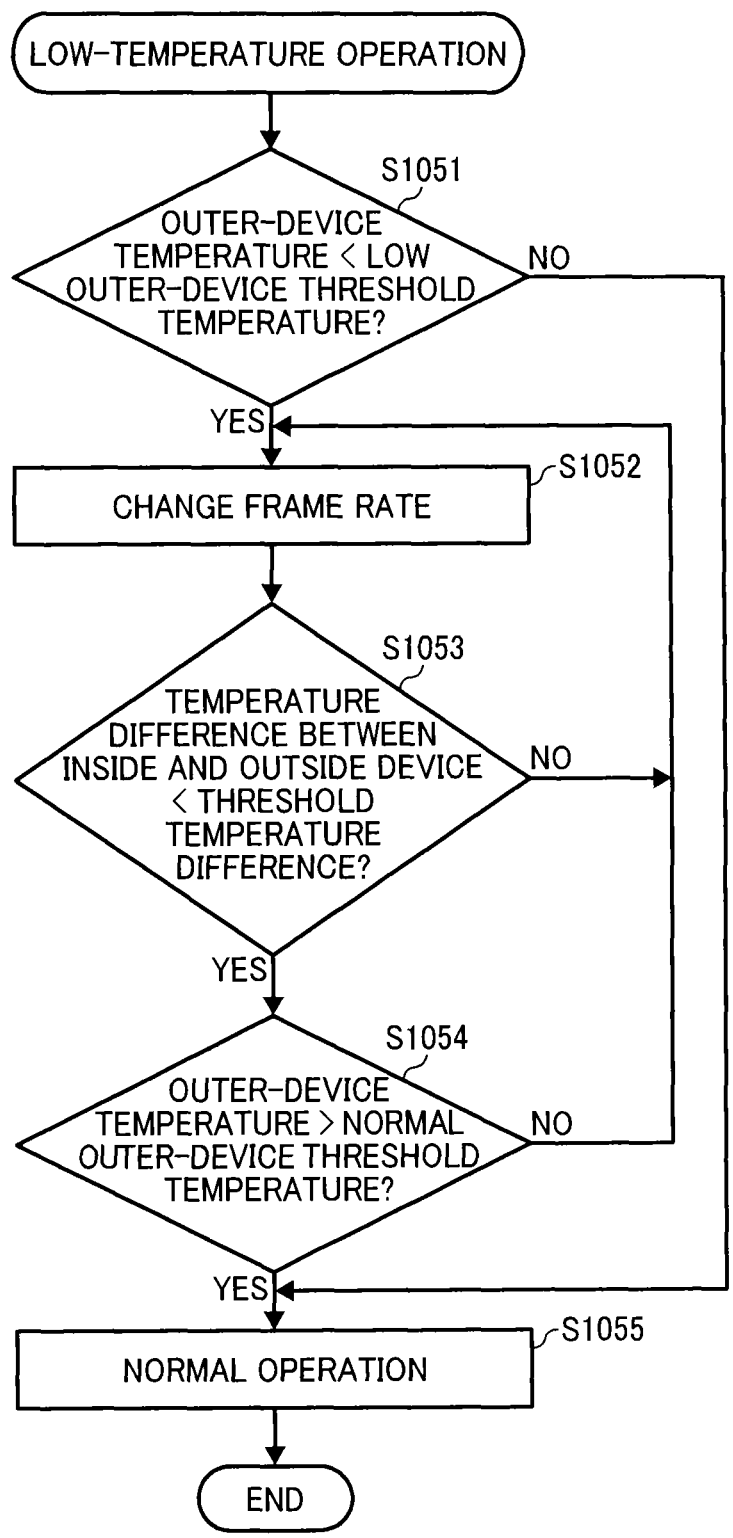
FIG. 5 is a flowchart of low-temperature operation in the image processing method of FIG. 2, according to an example embodiment of the present invention.

FIG. 5 is a flowchart of low-temperature operation in the image processing method of FIG. 2, according to the present example embodiment. As illustrated in FIG. 5, the controller 105 obtains the outer-device temperature from the external temperature sensor 111, and determines whether or not the outer-device temperature is lower than a low outer-device threshold temperature (for example, 25 degree Celsius) (S1051).

When the outer-device temperature is lower than the low outer-device threshold temperature ("YES" in S1051), the controller 105 changes the frame rate based on a difference between the obtained inner-device temperature and the outer-device temperature (i.e., temperature difference between inside and outside the device) (S1052).

Figure 6:
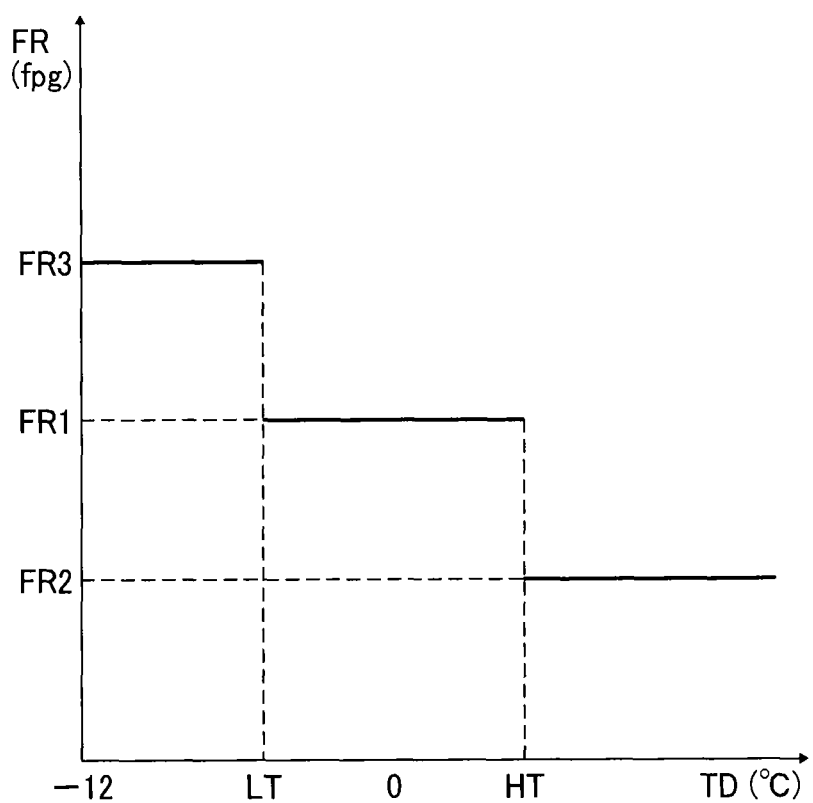
FIG. 6 is a diagram illustrating the relationship between the frame rate and the temperature difference between inside and outside the device in the low-temperature operation of FIG. 5, according to an example embodiment of the present invention.

FIG. 6 illustrates the relationship between the frame rate FR and the temperature difference between inside and outside the device TD in the low-temperature operation of FIG. 5, according to the present example embodiment. As illustrated in FIG. 6, when the temperature difference between inside and outside the device TD is equal to or greater than the threshold temperature difference HT (e.g., +8 degree Celsius), the controller 105 transmits to the image processing unit 102 the commands for decreasing the frame rate of the imaging element 101 from the FR1 (e.g., 60 fps) to the FR2 (e.g., 30 fps).

On the other hand, when the outer-device temperature exceeds the low outer-device threshold temperature ("NO" in S1051), the controller 105 terminates the low-temperature operation and returns the operation to the normal operation (S1055).

After the frame rate is changed, the controller 105 determines whether or not the temperature difference between inside and outside the device TD is lower than the threshold temperature difference HT (S1053).

When the temperature difference between inside and outside the device TD exceeds the threshold temperature difference HT ("NO" in S1053), the controller 105 returns the process to the process of S1052 such that the temperature difference between inside and outside the device TD becomes lower than the threshold temperature difference HT.

On the other hand, when the temperature difference between inside and outside the device TD is lower than the threshold temperature difference HT ("YES" in S1053), the controller 105 determines whether or not the outer-device temperature exceeds a normal outer-device threshold temperature (for example, equal to or higher than 25 degree Celsius) (S1054).

When the outer-device temperature exceeds the normal outer-device threshold temperature ("YES" in S1054), the controller 105 transmits commands for changing the frame rate from the FR2 to the original frame rate FR1 to the image processing unit 102 to shift to the normal operation (S1055), and then terminates the low-temperature operation.

On the other hand, when the outer-device threshold temperature runs below the normal outer-device threshold temperature ("NO" in S1054), the controller 105 returns the process to the process of S1052 such that the outer-device temperature becomes higher than the normal outer-device threshold temperature.

<Image Processing Method (2)>

An image processing method according to another example embodiment of the present invention is described below. In the present example embodiment, the controller 105 performs an image processing method according to the inner temperature and outer temperature of the imaging device 1 immediately after the imaging device 1 starts operating.

In a similar manner to the example embodiment described above, the controller 105 switches the starting operation based on a threshold temperature of the inner-device temperature (prescribed inner-device temperature), a threshold temperature of the outer-device temperature (prescribed outer-device temperature), and a threshold temperature difference of the temperature difference between inside and outside the device (prescribed temperature difference), each of which is stored in the ROM 103.

Figure 7:
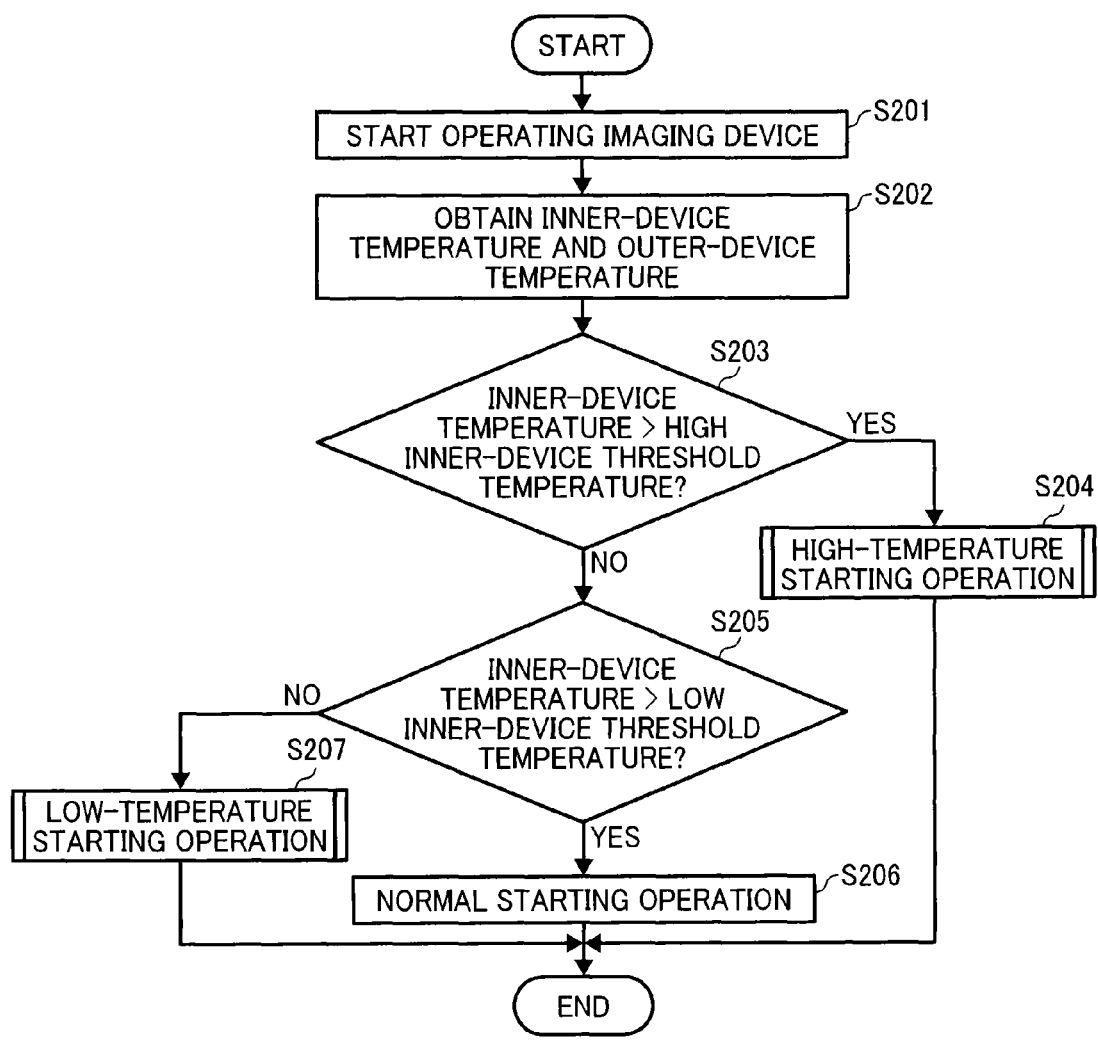
FIG. 7 is a flowchart of an image processing method performed when the imaging device of FIG. 1 starts operating, according to an example embodiment of the present invention.

FIG. 7 is a flowchart of an image processing method performed when the imaging device 1 starts operating, according to the present example embodiment. As illustrated in FIG. 7, after the imaging device 1 starts operating (S201), the controller 105 obtains the inner-device temperature and the outer-device temperature from the temperature sensor 106 and the external temperature sensor 111, respectively (S202).

After the inner-device temperature and the outer-device temperature are obtained, the controller 105 determines whether or not the obtained inner-device temperature exceeds a high inner-device threshold temperature stored in the ROM 103 (S203).

When the inner-device temperature exceeds a high inner-device threshold temperature ("YES" in S203), the controller 105 performs high-temperature starting operation (S204) as will be described later and terminates the process.

When the inner-device temperature is lower than a high inner-device threshold temperature ("NO" in S203), the controller 105 determines whether or not the inner-device temperature exceeds a low inner-device threshold temperature (S205).

When the inner-device temperature exceeds a low inner-device threshold temperature ("YES" in S205), the controller 105 performs normal starting operation (S206) and terminates the process. Note that the normal starting operation indicates a starting operation in which image processing is performed at a normal frame rate unlike high-temperature starting operation or low-temperature starting operation in which the frame rate is changed.

On the other hand, when the inner-device temperature is lower than a low inner-device threshold temperature ("NO" in S205), the controller 105 performs low-temperature starting operation (S207) as will be described later and terminates the process.

<High-Temperature Starting Operation>

Next, high-temperature starting operation in the image processing method according to the present example embodiment of the present invention is described. The high-temperature starting operation is performed, for example, to deal with a problem such as deterioration in image quality caused due to the high temperature inside the imaging device 1 when the imaging device 1 starts operating.

More specifically, the high-temperature starting operation is an operation in which the frame rate of the imaging element 101 is changed to control the amount of heat generated by the imaging element 101. By so doing, the temperature difference between inside and outside the imaging device 1 is attenuated.

Figure 8:
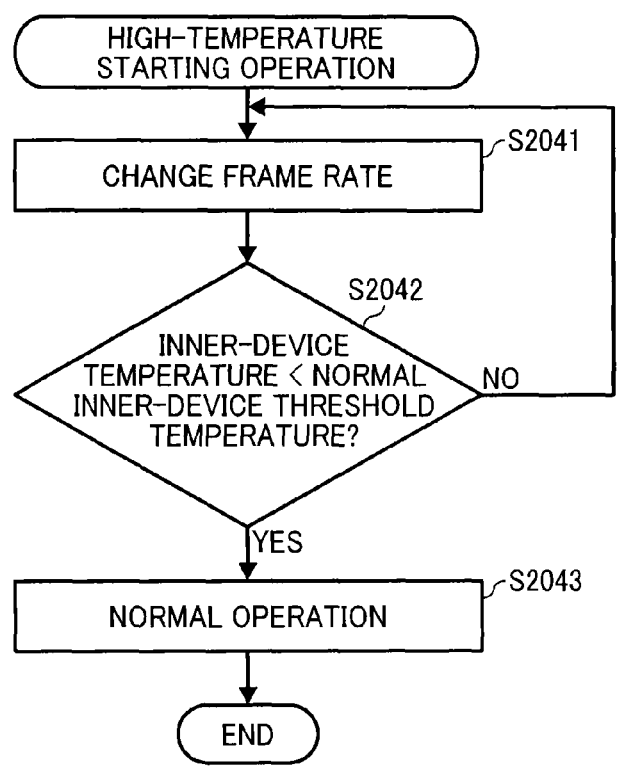
FIG. 8 is a flowchart of high-temperature starting operation in the image processing method of FIG. 7, according to an example embodiment of the present invention.

FIG. 8 is a flowchart of high-temperature starting operation in the image processing method of FIG. 7, according to the present example embodiment. As illustrated in FIG. 8, the controller 105 changes the frame rate in the high-temperature starting operation (S2041).

Figure 9:
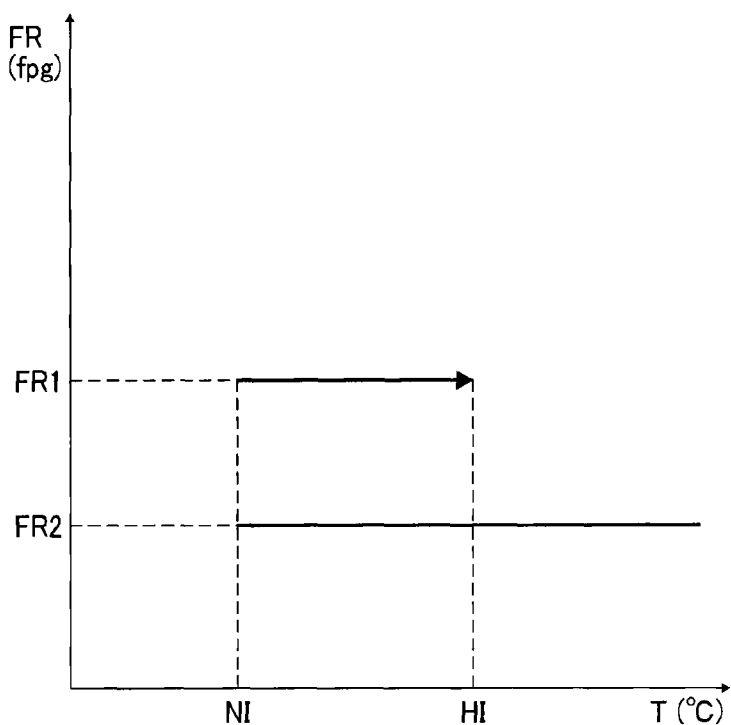
FIG. 9 depicts the relationship between a frame rate and an inner-device temperature in the high-temperature starting operation of FIG. 8, according to an example embodiment of the present invention.

FIG. 9 depicts the relationship between the frame rate FR and the inner-device temperature T in the high-temperature starting operation of FIG. 8, according to the present example embodiment. As depicted in FIG. 9, when the inner-device temperature T is lower than the high inner-device threshold temperature HI (for example, 60 degree Celsius), the controller 105 sets the frame rate FR to an FR 1 (that is, for example, 60 fps) as the normal starting operation.

On the other hand, as depicted in FIG. 8, when the inner-device temperature T is higher than the high inner-device threshold temperature HI, the controller 105 sets the frame rate FR to an FR 2 (that is, for example, 30 fps) as the high-temperature starting operation. The controller 105 transmits the commands for decreasing the frame rate of the imaging element 101 to the image processing unit 102.

Upon receiving the commands from the controller 105, the image processing unit 102 reads the parameter of frame rate from the RAM 104, and transmits the read parameter to the imaging element 101. The imaging element 101 changes the frame rate according to the received parameter, and outputs the obtained image data.

After the frame rate is changed, the controller 105 determines whether or not the inner-device temperature T is lower than a normal inner-device threshold temperature NI (i.e., 40 degree Celsius in FIG. 4) (S2042).

When the inner-device temperature T exceeds the normal inner-device threshold temperature NI ("NO" in S2042), the controller 105 returns to the process in S2041 and changes the frame rate.

When the inner-device temperature T is lower than the normal inner-device threshold temperature NI ("YES" in S2042), the controller 105 transmits commands for changing the frame rate back to the original frame rate FR1 to the image processing unit 102 and shifts to the normal operation, and then terminates the high-temperature starting operation (S2043).

<Low-Temperature Starting Operation>

Next, low-temperature starting operation in the image processing method according to the present example embodiment of the present invention is described. The low-temperature starting operation is performed to deal with a problem such as condensation caused due to the temperature difference between inside and outside the imaging device 1. Such a problem occurs, for example, when the imaging device 1 is left in a subfreezing condition for a while and the inner temperature of the imaging device 1 increases after the startup or when the imaging device 1 starts operating after the imaging device 1 is cooled down by an air conditioner.

More specifically, the low-temperature starting operation is an operation in which the frame rate of the imaging element 101 is changed to control the amount of heat generated by the imaging element 101. By so doing, the temperature difference between inside and outside the imaging device 1 is attenuated.

Figure 10:
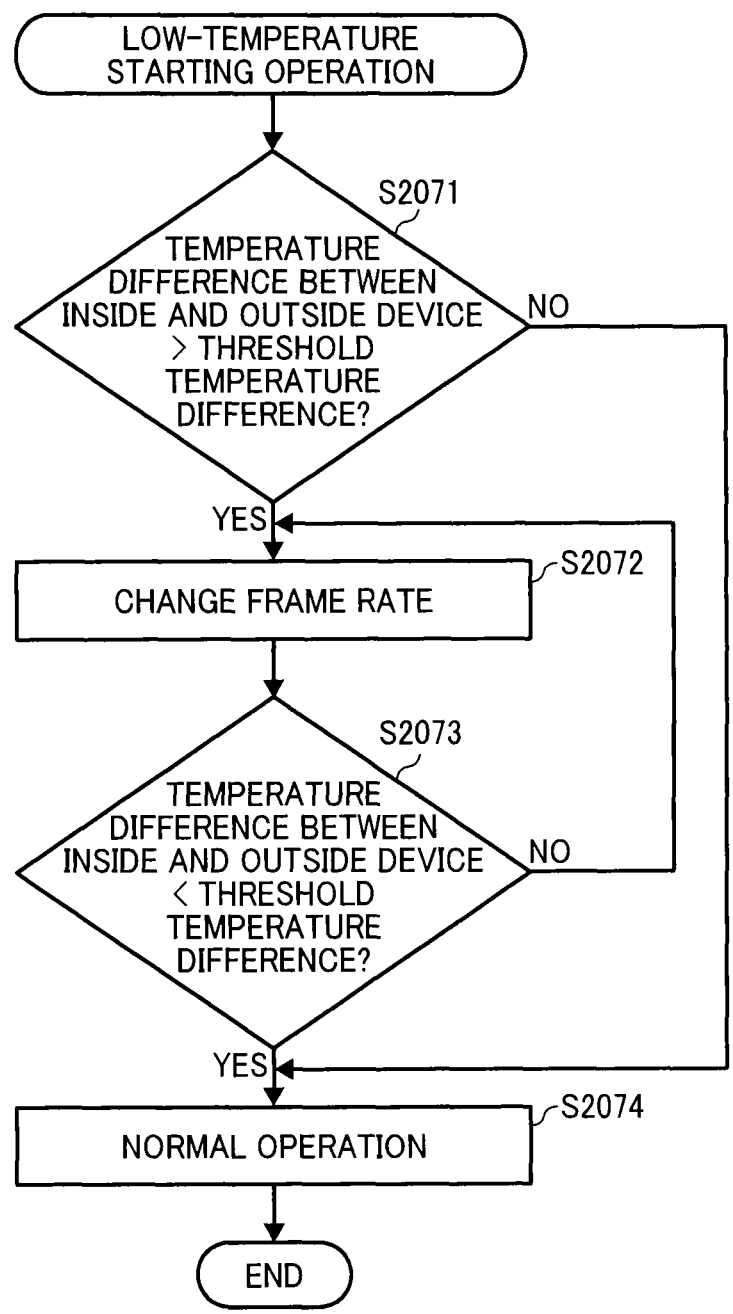
FIG. 10 is a flowchart of low-temperature starting operation in the image processing method of FIG. 7, according to an example embodiment of the present invention.

FIG. 10 is a flowchart of low-temperature starting operation in the image processing method of FIG. 7, according to the present example embodiment. As illustrated in FIG. 10, the controller 105 determines whether the temperature difference between inside and outside the device exceeds a threshold temperature difference (for example, +8 degree Celsius) (S2071).

When the temperature difference between inside and outside the device exceeds a threshold temperature difference (for example, +8 degree Celsius) ("YES" in S2071), the controller 105 changes the frame rate based on the diagram of FIG. 6 in which the relationship between the frame rate and the temperature difference between inside and outside the device is illustrated (S2072).

As illustrated in FIG. 6, when the temperature difference between inside and outside the device TD is equal to or greater than the threshold temperature difference HT (e.g., +8 degree Celsius), the controller 105 transmits to the image processing unit 102 the commands for decreasing the frame rate of the imaging element 101 from the FR1 (e.g., 60 fps) to the FR2 (e.g., 30 fps).

On the other hand, when the temperature difference between inside and outside the device is smaller than a threshold temperature difference ("NO" in S1051), the controller 105 performs normal operation (S2074) and terminates the low-temperature starting operation.

After the frame rate is changed, the controller 105 determines whether or not the temperature difference between inside and outside the device is lower than the threshold temperature difference (S2073).

When the temperature difference between inside and outside the device TD exceeds the threshold temperature difference HT ("NO" in S2073), the controller 105 returns the process to the process of 52072 such that the temperature difference between inside and outside the device TD becomes lower than the threshold temperature difference HT.

On the other hand, when the temperature difference between inside and outside the device TD is smaller than a threshold temperature difference HT ("YES" in S2073), the controller 105 returns the frame rate from 30 fps to 60 fps, and performs normal operation (S2074). Then, the controller 105 terminates the low-temperature starting operation.

The imaging device 1 obtains the inner-device temperature of an image processing device and the outer-device temperature of the image processing device, and changes the frame rate of image data based on the obtained inner-device temperature and outer-device temperature. Accordingly, the imaging device 1 can solve a problem or failure such as condensation caused due to the temperature difference between inside and outside the image processing device.

When the inner-device temperature exceeds the outer-device temperature, the imaging device 1 changes the frame rate to a lower frame rate. Accordingly, the amount of the heat generated by the imaging element 101 is reduced, and a problem or failure caused due to the temperature difference between inside and outside the image processing device is solved.

When the inner-device temperature is lower than the outer-device temperature, the imaging device 1 changes the frame rate to a higher frame rate. Accordingly, the amount of the heat generated by the imaging element 101 is increased, and a problem or failure caused due to the temperature difference between inside and outside the image processing device is solved.

When the outer-device temperature exceeds a prescribed outer-device temperature (i.e., high outer-device threshold temperature), the imaging device 1 changes the frame rate to a lower frame rate. Accordingly, the amount of the heat generated by the imaging element 101 is reduced, and a problem or failure caused due to the temperature difference between inside and outside the image processing device is solved.

When the outer-device temperature is lower than a prescribed outer-device temperature (i.e., high inner-device threshold temperature, normal outer-device threshold temperature, and low outer-device threshold temperature), the imaging device 1 changes the frame rate to a higher frame rate. Accordingly, the amount of the heat generated by the imaging element 101 is increased, and a problem or failure caused due to the temperature difference between inside and outside the image processing device is solved.

When the inner-device temperature exceeds a prescribed inner-device temperature (i.e., high inner-device threshold temperature), the imaging device 1 changes the frame rate to a lower frame rate. Accordingly, the amount of the heat generated by the imaging element 101 is reduced, and a problem or failure caused due to the temperature difference between inside and outside the image processing device is solved.

When the inner-device temperature is lower than a prescribed inner-device temperature (i.e., high inner-device threshold temperature, normal inner-device threshold temperature, and low inner-device threshold temperature), the imaging device 1 changes the frame rate to a higher frame rate. Accordingly, the amount of the heat generated by the imaging element 101 is increased, and a problem or failure caused due to the temperature difference between inside and outside the image processing device is solved.

When the temperature difference exceeds a prescribed temperature difference (i.e., threshold temperature difference), the imaging device 1 changes the frame rate. Accordingly, the amount of the heat generated by the imaging element 101 is controlled, and a problem or failure caused due to the temperature difference between inside and outside the image processing device is solved.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory cards, ROM, etc. Alternatively, any one of the above-described and other methods of the present invention may be implemented by ASICs, prepared by interconnecting an appropriate network of conventional component circuits, or by a combination thereof with one or more conventional general-purpose microprocessors and/or signal processors programmed accordingly.

What is claimed is:

1. An image processing device comprising:
   circuitry configured to
   perform image processing on image data at an initial predetermined frame rate, the initial predetermined frame rate being lower than a high frame rate and higher than a low frame rate,
   obtain an inner-device temperature and outer-device temperature of the image processing device,
   change a frame rate of the image data processed by the circuitry, based on at least one of-the inner-device temperature, the outer-device temperature, and a temperature difference between the inner-device temperature and the outer-device temperature, and
   increase the initial predetermined frame rate when the outer-device temperature is lower than a prescribed outer-device temperature.

2. The image processing device according to claim 1, wherein the circuitry decreases the initial predetermined frame rate when the inner-device temperature exceeds the outer-device temperature.

3. The image processing device according to claim 1, wherein the circuitry increases the initial predetermined frame rate when the inner-device temperature is lower than the outer-device temperature.

4. The image processing device according to claim 1, wherein the circuitry decreases the initial predetermined frame rate when the outer-device temperature exceeds a prescribed outer-device temperature.

5. The image processing device according to claim 1, wherein the circuitry decreases the initial predetermined frame rate when the inner-device temperature exceeds a prescribed inner-device temperature.

6. The image processing device according to claim 1, wherein the circuitry increases the initial predetermined frame rate when the inner-device temperature is lower than a prescribed inner-device temperature.

7. The image processing device according to claim 1, wherein the circuitry changes the initial predetermined frame rate when the temperature difference exceeds a prescribed temperature difference.

8. The image processing device of claim 1, wherein the circuitry is further configured to:
   activate a normal operation mode,
   switch to a high-temperature operation mode of the image processing device when the inner-device temperature exceeds an inner-device threshold temperature, and
   switch to a low-temperature operation mode of the image processing device when the temperature difference is greater than a temperature threshold difference.

9. The image processing device of claim 8, wherein the frame rate associated with the normal operation mode is the initial predetermined frame rate, and wherein the initial predetermined rate is greater than the frame rate of the high-temperature operation mode and lower than the low-temperature operation mode.

10. An imaging device comprising:
   an imaging circuit configured to obtain image data; and
   the image processing device according to claim 1.

11. A method of processing an image, the method comprising:
   performing, with circuitry, image processing. on image data at an initial predetermined frame rate, the initial predetermined frame rate being lower than a high frame rate and higher than a low frame rate;
   obtaining, with the circuitry, an inner-device temperature of the image processing device;
   obtaining, with the circuitry, an outer-device temperature of the image processing device; and
   changing, with the circuitry, a frame rate of the image data, based on at least one of the inner-device temperature, the outer-device temperature, and a temperature difference between the inner-device temperature and the outer-device temperature, wherein
   the changing includes increasing the initial predetermined frame rate when the outer-device temperature is lower than a prescribed outer-device temperature.

12. The method according to claim 11, wherein the changing includes decreasing the initial predetermined frame rate when the inner-device temperature exceeds the outer-device temperature.

13. The method according to claim 11, wherein the changing includes increasing the initial predetermined frame rate when the inner-device temperature is lower than the outer-device temperature.

14. The method according to claim 11, wherein the changing includes decreasing the initial predetermined frame rate when the outer-device temperature exceeds a prescribed outer-device temperature.

15. The method according to claim 11, wherein the changing includes decreasing the initial predetermined frame rate when the inner-device temperature exceeds a prescribed inner-device temperature.

16. The method according to claim 11, wherein the changing includes increasing the initial predetermined frame rate when the inner-device temperature is lower than a prescribed inner-device temperature.

17. The method according to claim 11, wherein the changing includes changing the initial predetermined frame rate when the temperature difference exceeds a prescribed temperature difference.

18. A computer-readable non-transitory recording medium storing a program for causing a computer to execute an image processing method, the method comprising:
   performing image processing on image data at an initial predetermined frame rate, the initial predetermined frame rate being lower than a high frame rate and higher than a low frame rate;
   obtaining an inner-device temperature and outer-device temperature of the image processing device; and
   changing a frame rate of the image data, based on at least one of the inner-device temperature, the outer-device temperature, and a temperature difference between the inner-device temperature and the outer-device temperature, wherein
   the changing includes increasing the initial predetermined frame rate when the outer-device temperature is lower than a prescribed outer-device temperature.

* * * * *